US006447710B1

(12) United States Patent
Prevotat et al.

(10) Patent No.: US 6,447,710 B1
(45) Date of Patent: Sep. 10, 2002

(54) METHOD AND INSTALLATION FOR MAKING PLASTIC TUBES WITH BI-AXIAL DRAWING, AND RESULTING PLASTIC TUBE

(75) Inventors: Bernard Prevotat, Le Chesnay; Jean-Jacques Acket, Challuy, both of (FR)

(73) Assignee: Alphacan (FR)

( * ) Notice: Subject to any disclaimer, the term of this patent is extended or adjusted under 35 U.S.C. 154(b) by 0 days.

(21) Appl. No.: 09/269,260

(22) PCT Filed: Sep. 18, 1997

(86) PCT No.: PCT/FR97/01652

§ 371 (c)(1),
(2), (4) Date: Mar. 22, 1999

(87) PCT Pub. No.: WO98/13190

PCT Pub. Date: Apr. 2, 1998

(30) Foreign Application Priority Data

Sep. 26, 1996 (FR) .............................. 96 11704

(51) Int. Cl.[7] .............................................. B29C 49/08
(52) U.S. Cl. ..................... 264/532; 264/535; 425/529; 425/530; 425/526
(58) Field of Search ................................. 264/532, 535; 425/529, 530, 526

(56) References Cited

U.S. PATENT DOCUMENTS

| | | | | | |
|---|---|---|---|---|---|
| 3,160,130 | A | * | 12/1964 | Pesak ............................ | 72/56 |
| 4,098,857 | A | | 7/1978 | Farrell .......................... | 264/89 |
| 4,340,344 | A | * | 7/1982 | Aston et al. ................. | 425/149 |
| 4,499,045 | A | * | 2/1985 | Obsomer ..................... | 264/532 |
| 5,067,888 | A | * | 11/1991 | Torsten ...................... | 425/387.1 |
| 5,356,591 | A | * | 10/1994 | Pinchuk et al. ............. | 264/573 |
| 5,526,847 | A | * | 6/1996 | Macovaz et al. ........... | 138/109 |

FOREIGN PATENT DOCUMENTS

| | | |
|---|---|---|
| DE | P 27 05 775.6-16 | 8/1978 |
| DE | 34 28 191 A1 | 2/1986 |
| EP | 0 072 064 A1 | 2/1983 |
| EP | 0 404 557 A2 | 12/1990 |
| GB | 1 432 539 | 4/1976 |
| GB | 2 207 630 A | 2/1989 |
| HU | 186357 | 7/1985 |
| HU | 188860 | 9/1985 |
| HU | 198323 | 11/1988 |
| HU | 209197 | 3/1992 |

\* cited by examiner

*Primary Examiner*—Suzanne E. McDowell
(74) *Attorney, Agent, or Firm*—Pennie & Edmonds LLP

(57) ABSTRACT

The invention concerns a method for making plastic tubes, whereby a tube blank (Te) brought to a temperature close to molecular orientation temperature is subjected to a bi-axial drawing, by radial expansion of the tube blank inside a forming shaft (2), with formation of a contraction cavity at one end of the tube, by controlled displacement of this contraction cavity to the other end of the tube, and by longitudinal drawing. The radial expansion is carried out in at least two phases, viz. a first phase during which the tube blank (Te) is inflated to an intermediate diameter (Di) determined by a double-walled envelope (21), introduced into the forming shaft (2), with circulation of a hot fluid between the two walls of the envelope (21), and then the envelope is gradually removed from the forming shaft (2) to enable, during a second phase, the radial expansion of the plastic tube up to an internal diameter of the forming shaft (2), and its longitudinal drawing.

14 Claims, 4 Drawing Sheets

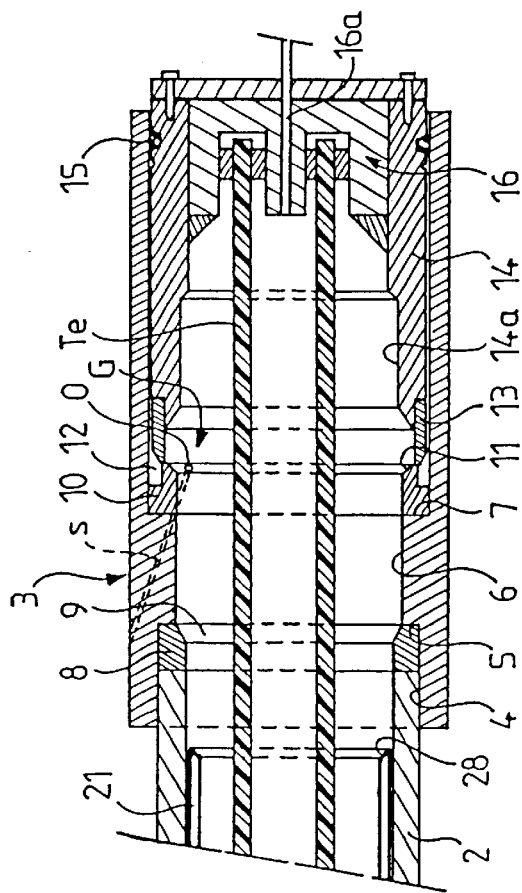
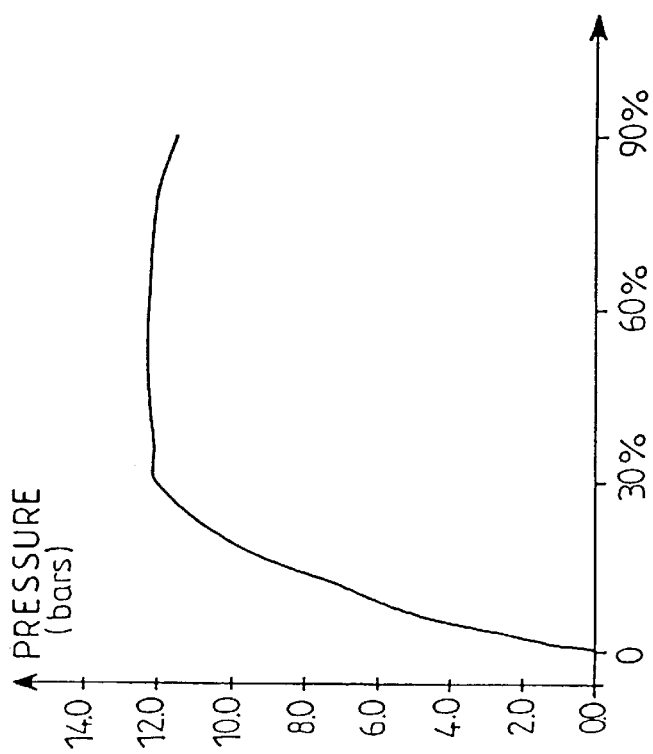
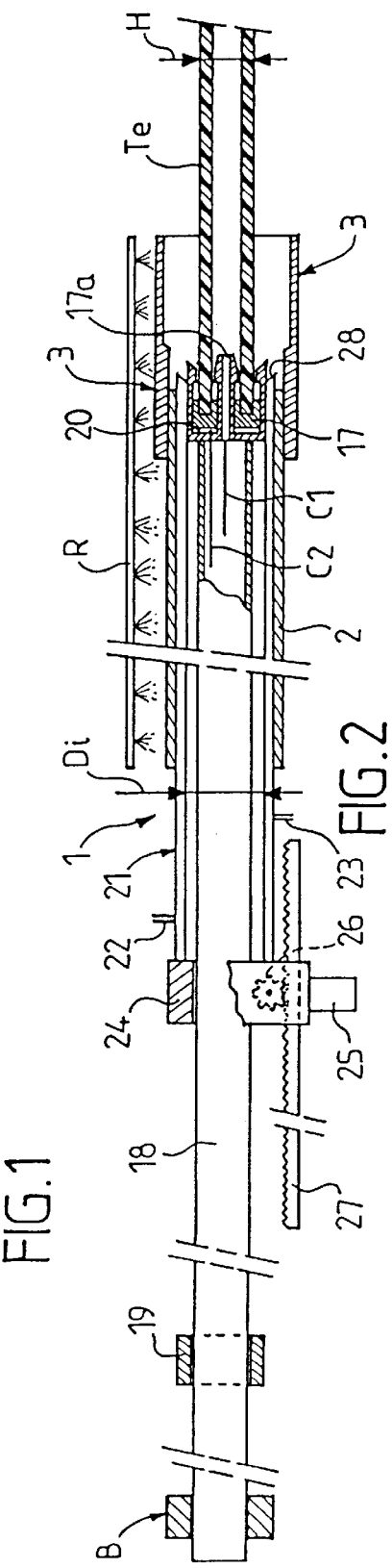
FIG.1
FIG.2
FIG.3

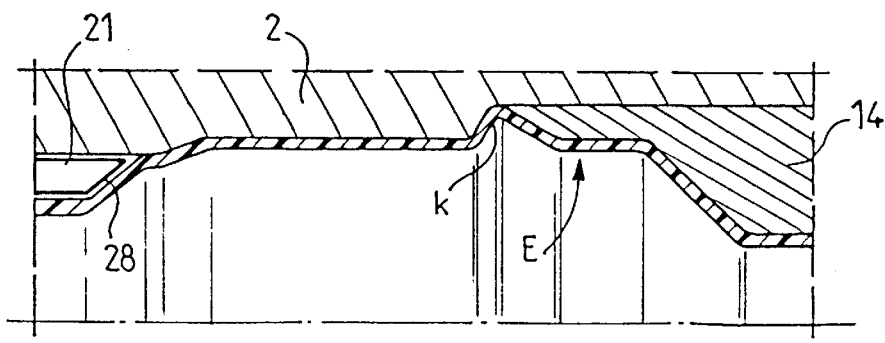
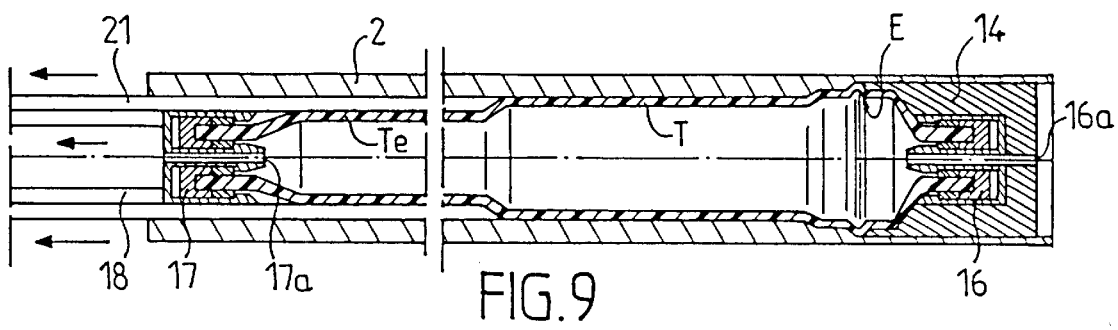
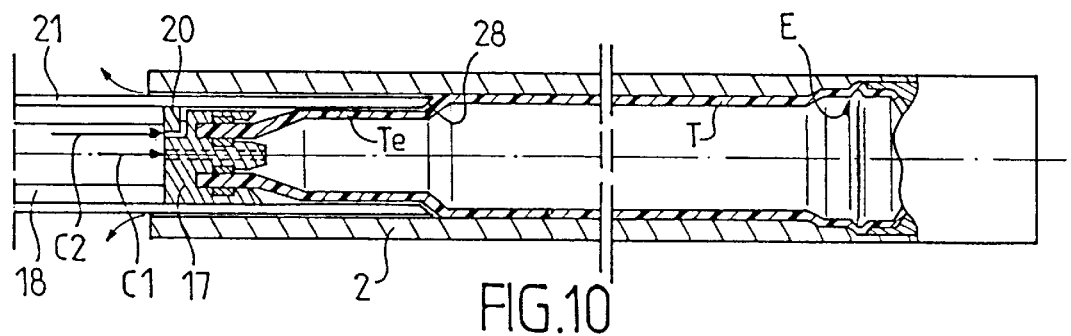
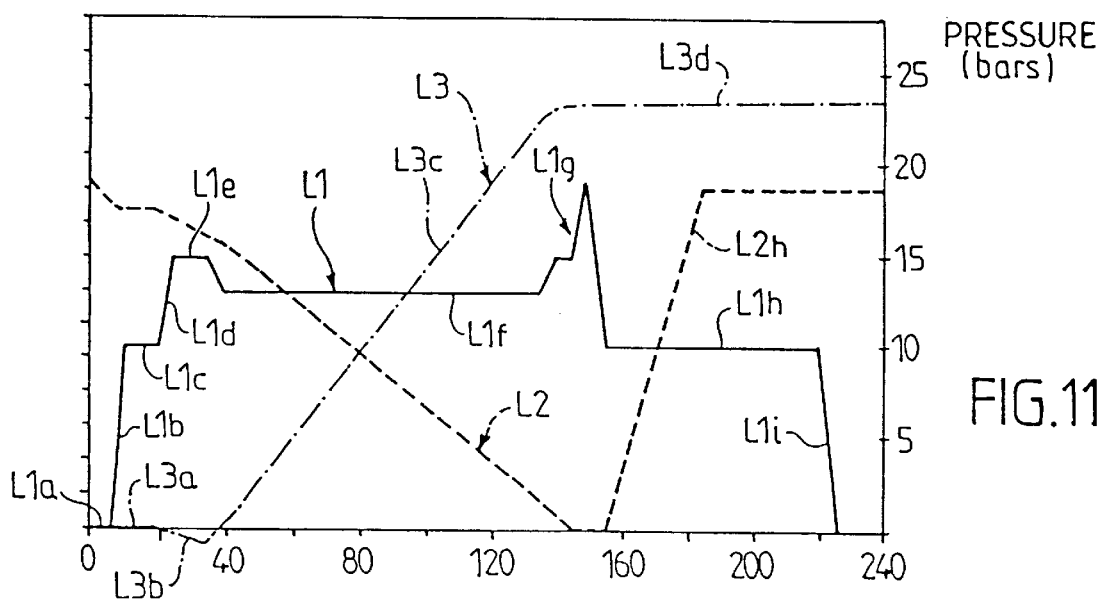

METHOD AND INSTALLATION FOR MAKING PLASTIC TUBES WITH BI-AXIAL DRAWING, AND RESULTING PLASTIC TUBE

The invention relates to a method for the manufacture of plastic tubes, of the type according to which a tube blank brought to a temperature near its molecular orientation temperature is subjected to biaxial stretching as a result of radial expansion of the tube blank within a forming barrel, the inside diameter of which is equal to the diameter desired for the plastic tube, with the exception of the thermal expansion, with the formation of a blister at one end of the tube and controlled displacement of this blister as far as the other end of the tube, and with longitudinal stretching.

Such a method makes it possible to manufacture molecularly oriented plastic tubes having improved mechanical properties.

GB-A-1,432,539 teaches such a method in a form which, however, proves difficult to employ for pipes of great length. In fact, during pressurization, inflation (formation of the blister) and therefore molecular orientation are often initiated at a plurality of locations at the same time; this phenomenon, which is difficult to control, gives rise to pronounced thickness variations in the longitudinal direction and even to folds where two expansion fronts meet.

U.S. Pat. No. 4,098,857 affords an improvement to the abovementioned bi-orientation method by the use, within a mould, of a sleeve which grips the blank. At the start of the operation, the sleeve restricts radial expansion and is then progressively withdrawn in order to allow the stretching zone to advance.

EP-B-0,072,064 also uses such as a sleeve which grips a tube blank; during manufacture, the sleeve is progressively withdrawn, and a counterpressure system is provided for adjusting the axial displacement of the sleeve which, at one end (in contact with the wall of the tube blank during stretching), is equipped with an annular piston of widened frustoconical shape. The longitudinal stretching of the tube blank is essentially obtained as a result of the friction of the sleeve on the cross-section of the tube during its relative displacement along the tube. Such a solution, although making it possible to control the displacement of the blister, brings frictional forces into action in order to ensure longitudinal stretching; now it is known to be difficult to control accurately the frictional forces between two moving parts, so that longitudinal stretching risks causing appreciable variations along the tube. Moreover, the friction of the sleeve against the outer surface of the plastic tube may cause defects in appearance on this surface.

The object of EP-A-0,404,557 is to provide a positive control of the longitudinal stretching of the tube blank, this control being absent from the method mentioned above. That end of the tube blank which is opposite that where the blister initially forms is locked in a piston which exerts a stretching force on the tube blank, so that friction between tube blank and sleeve is no longer necessary for ensuring such a stretching force. The method according to EP-A-0,404,557 therefore makes it possible to improve uniformity in the degree of longitudinal stretching over the length of the tube.

However, so that the stretching of the plastic tube can take place under good conditions, this tube has to be brought to and maintained at an appropriate temperature, near its molecular orientation temperature, by means of a hot fluid which, according to EP-A-0,404,557, circulates not only in the plastic tube blank, but also around the sleeve. The hot fluid which passes around the sleeve is in direct contact with the inner surface of the forming barrel which is thus maintained at a relatively high temperature.

At the end of radial expansion, according to EP-A-0,404,557, the plastic of the tube blank comes into contact with the hot inner surface of the forming barrel and does not set rapidly, even if, as provided, a cold fluid is circulated within the plastic tube. This relatively slow cooling of the outer layer of the tube contributes to increasing the duration of the forming cycle and to reducing the productivity of the method.

The object of the invention is, above all, to provide a method which overcomes these disadvantages and makes it possible to improve productivity appreciably.

The method according to the invention is characterized in that the radial expansion is carried out in at least two phases, namely:

a first phase, during which the tube blank is inflated to an intermediate diameter determined by a double-walled casing introduced into the forming barrel, with a hot fluid circulating between the two walls of the casing, and, subsequently, the casing is progressively taken out of the forming barrel in order, during a second phase, to allow the radial expansion of the plastic tube to the inside diameter of the forming barrel, and the longitudinal stretching of the said tube, and the forming barrel is cooled externally.

The presence of the double-walled casing, along with internal circulation of hot fluid, makes it possible to maintain the temperature of the tube blank, whilst avoiding direct heating of the inner surface of the forming barrel, by virtue of which the duration of the forming cycle is reduced and productivity is increased.

According to another aspect of the invention, which may be used independently or in combination with the preceding aspect, the object of the invention is to make radial expansion uniform along the entire length of the tube, despite the size of this expansion.

Preferably, another object of the invention is to provide a method making it possible to produce a socket at one end of the tube, with a groove for receiving a gasket, whilst ensuring a virtually constant thickness of the tube obtained over its entire length, including in the region of the socket.

The object of the invention, furthermore, is to provide a method which remains relatively simple and economical to put into practice.

This other aspect of the invention is based on an analysis of the phenomenon of expansion of a tube blank as a result of an increase in the internal pressure and on considerations regarding the actual stresses generated in the thickness of the tube. FIG. 1 of the accompanying drawings is a graph illustrating the diameter variations, expressed as a percentage and plotted on the abscissa, of a plastic tube (at a temperature near the molecular orientation temperature) subjected to an internal pressure, the value of which is plotted on the ordinate. It emerges that the diameter variations are broken down into several steps:

a first step, corresponding to a substantially rectilinear ascending part, characterizes a uniform increase in the diameter of the tube to approximately 30% with the increase in the internal pressure;

a second step, in which the stress in the wall passes through a maximum and then descends again very slightly in order to stabilize at a constant value while the diameter increases: this is the blister phenomenon.

This phenomenon may terminate in a third step, in which the value of the actual stress in the wall decreases slightly.

For manufacture, therefore, it is indispensable to raise the internal pressure of the tube to a critical value in order to start a blister, and then stabilize this pressure in order to avoid the rapid bursting of the tube.

In the first step, corresponding to the uniform increase in the diameter of the tube, the circumferential elongation caused by expansion remains below or equal to the yield point of the material of the tube. In the second step, corresponding to the blister phenomenon, the circumferential elongation exceeds the yield point of the material of the tube.

The method according to the second aspect of the invention, for the purpose of making the expansion phenomenon as uniform as possible, is characterized in that the radial expansion is carried out in at least two phases, namely:

a first phase, during which the tube blank is inflated uniformly to an intermediate diameter which is below the inside diameter of the forming barrel and at which the circumferential elongation remains below or equal to the yield point of the material of the tube, this first phase taking place virtually without any longitudinal stretching, and at least one other phase for changing to the inside diameter of the forming barrel, with longitudinal stretching.

Preferably, the intermediate diameter is determined by introducing into the forming barrel a sliding casing, the inside diameter of which is equal to the intermediate diameter, and, after the first expansion phase, this casing is progressively taken out of the forming barrel in order to allow the second phase of radial expansion.

The longitudinal stretching of the tube, carried out essentially during this second phase, is obtained by locking the two ends of the tube blank in respective clamping means and by moving the means for clamping one end away from the means for clamping the other end of the tube.

Advantageously, a gas under pressure, especially compressed air, is injected between the outer wall of the plastic tube and the inner wall of the casing, in order to make it easier for these two parts to slide relative to one another at the moment when the tube is taken out of the casing and to avoid unwanted friction.

Preferably, a free space remains, within the forming barrel, between that end of the sliding casing which is fully engaged in the barrel and the adjacent end of the barrel, this free space making it possible to produce the blister as a result of an increase in the internal pressure in the tube blank, without the need to displace the sliding casing beforehand.

That end of the plastic tube which is distant from the blister formation zone can be pushed towards this zone at the moment of production of the blister, in order to bring about an increase in the thickness of the material making it possible to obtain a blister having a thickness which is substantially equal to that of the remaining part of the tube.

Advantageously, a socket with a groove for receiving a gasket is produced on the plastic tube during the formation of the blister at one end of the tube.

Preferably, when the wall of the blister comes into contact with the wall of the socket mould, the adjacent end of the tube is pushed towards the socket, in order to obtain a wall thickness in the region of the groove for the gasket which is substantially equal to the thickness of the rest of the socket and of the tube.

Advantageously, the forming barrel is cooled externally by spraying or regulation.

The invention also relates to an installation for carrying out the above-defined method, this installation comprising a forming barrel, in which the tube blank is engaged, and means for shutting off and clamping each end of the tube blank, as well as means for circulating a fluid, especially a liquid, in the tube blank and for varying the pressure of this liquid, and is characterized in that it comprises a double-walled casing and means for circulating a hot fluid, in particular at a temperature near the orientation temperature, in this casing which is mounted slidably in the forming barrel and which, by means of its inside diameter, determines an intermediate expansion diameter, this casing surrounding one end of the tube blank, the said end being provided with clamping means forming a piston mounted slidably in the casing and integral with a cylinder extending beyond the end of the casing, independent means for driving with a sliding action being provided respectively for the casing and for the cylinder equipped with the piston.

The piston mounted at the end of the cylinder preferably comprises passage means for injecting a gas under pressure, especially compressed air, between the outer wall of the plastic tube and the inner wall of the casing and for making it easier for them to slide relative to one another.

Advantageously, the installation comprises, at that end of the forming barrel which is opposite the cylinder equipped with the piston, means for clamping the end of the plastic tube, likewise forming means for shutting off the forming barrel and defining a mould for a socket at the end of the plastic tube.

The mould thus defined for the socket comprises at least two parts which determine a groove for a gasket and which are mounted slidably relative to one another, the part located axially towards the outside of the plastic tube being capable of approaching the other part in order to bring material into the region of the groove for the gasket and making it possible to obtain a wall having a thickness which is substantially constant over the entire length of the socket.

Advantageously, means for detecting the coming of the wall of the socket against the corresponding part of the mould are provided for triggering the displacement of the other part of the mould when contact is made.

The invention also relates to a bi-oriented plastic tube comprising a socket provided with a groove for receiving a gasket, the thickness of this tube being substantially constant over its entire length and in the region of the socket. The properties of the tube are substantially uniform over its entire length.

According to the invention, a bi-oriented plastic tube comprising a socket provided with a groove for receiving a gasket is also characterized in that the relative axial stretching of the socket is greater than the axial stretching of the remaining part of the finished tube.

Preferably, the axial stretching of the socket over its entirety is at least equal to 1.5 times the axial stretching of the remaining part of the tube.

Apart from the arrangements described above, the invention involves some other arrangements which will be dealt with more explicitly below with regard to an exemplary embodiment which is described with reference to the accompanying drawings, but which is in no way limiting.

FIG. 1 of these drawings is a graph illustrating the increase in diameter of a plastic tube, plotted on the abscissa and expressed as a percentage, whilst the pressure within the tube, expressed in bars (1 bar=$10^5$ Pa), is plotted on the ordinate.

FIG. 2 is a simplified diagram with cutaway parts of an installation according to the invention.

FIG. 3 shows in section, on a larger scale, that end of the forming barrel which is equipped with means for defining a mould for a socket.

FIG. 8 shows a detail of the production of the socket in section on a larger scale.

FIG. 9 is a diagram similar to that of FIG. 7, illustrating the propagation of the blister and the complementary radial expansion of the tube.

FIG. 10 is a diagrammatic sectional view of the installation, revealing an injection of compressed air during the phase illustrated in FIG. 9.

FIG. 11 is a graph illustrating the forming cycle.

Figure 12:
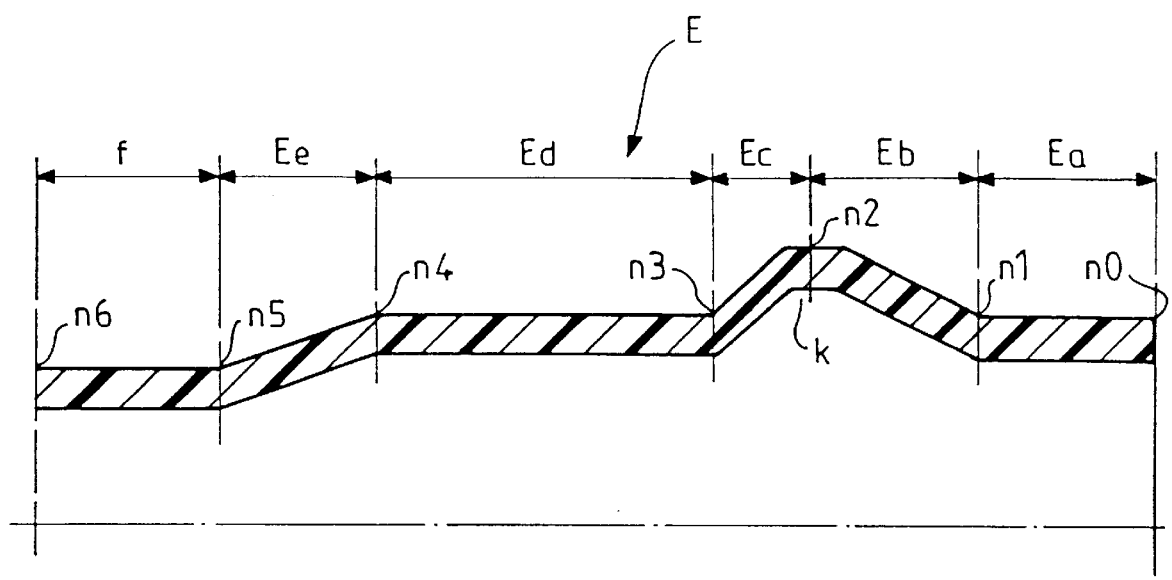

FIG. 12, finally, is a partial section of the socket on a larger scale.

Referring to the drawings, once again there is FIG. 1 which shows the graph already described.

FIG. 2 shows diagrammatically and partially an installation 1 for the manufacture of bi-oriented plastic tubes. This installation comprises a forming barrel 2 consisting of a cylindrical tube made of metal, for example steel, serving as a mould for the finished product to be obtained; the inside diameter of the forming barrel 2 is slightly larger than the outside diameter of the finished bi-oriented plastic tube, in order to allow for thermal contraction. The forming barrel 2 is provided, at one of its ends (the right-end according to FIG. 2), with a collar 3 which constitutes part of a mould for forming a socket E (FIGS. 7–10) at the corresponding end of the plastic tube T.

The outer wall of the forming barrel 2 is cooled by spraying water onto the outer surface of the barrel 2 with the aid of a sprinkler ramp R. The cooling of the outer wall of the collar 3 is also ensured, preferably by means of thermal regulation at a temperature located within the range of 20° C. to 30° C.

As illustrated in more detail in FIG. 3, the collar 3 comprises, at its end facing the barrel 2, a bore 4 having a diameter equal to the outside diameter of the barrel 2 engaged in this bore. The collar 3 is assembled together with the barrel 2 by any suitable means, especially by welding. The bore 4 is delimited internally by a radial shoulder 5 ensuring the transition to another bore 6 having a diameter smaller than that of the bore 4, but larger than the inside diameter of the barrel 2. A radial setback 7 ensures the transition between the bore 6 and a terminal bore having a larger diameter and greater length and extending as far as the outer end of the collar 3.

Arranged between the end of the barrel 2 and the shoulder 5 is a metal ring 8, of which the inside diameter, on the side facing the barrel 2, is equal to the inside diameter of this barrel, and then increases progressively in order to form a frustoconical chamfer 9, the large diameter of which is equal to the diameter of the bore 6. This bore 6 determines the outer surface of the socket E; its diameter is selected in such a way that the inside diameter of the socket E, in the region of the bore 6, makes it possible for the outside diameter of a finished plastic tube T, similar to that provided with a socket E, to be received with slight friction.

Another ring 10 bears axially against the setback 7. The inner bore of this ring 10 has the same diameter as the bore 6 and opens out, on the side opposite the bore 6, via a frustoconical chamfer 11 which defines a mould-wall zone serving for forming an outer rib on the finished tube T. A groove k (FIG. 7) for receiving a gasket corresponds, on the inner wall of the tube, to this rib. The ring 10 has, on its outer cylindrical surface, a peripheral clearance 12 in the region of its end provided with a chamfer 11. This clearance 12 makes it possible to define an annular space capable of receiving a cylindrical crown 13, with the possibility of axial sliding. This projecting crown 13 is integral with the end of a collar 14 engaged with slight friction in the bore of the collar 3. The collar 14 has an inner bore 14a having the same diameter as the bore 6.

The inner profile of the collar 14, in combination with that of the collar 3 and of the inner cylindrical surface of the crown 13, defines the cavity G for the socket E. In the exemplary embodiment of FIG. 2, the inner profile of the collar 14 is substantially symmetrical to the profile of that part of the collar 3 which is located to the left of the crown 13 in relation to the mid-plane of this crown. The cross-section of the groove k for the gasket may have a shape other than the V-shape illustrated in the drawings, for example a rectangular shape.

A groove 15 is provided on the outer surface of the collar 14 for fitting a gasket between the collars 3 and 14.

A device 16 for shutting off and clamping the adjacent end of the tube blank Te is provided for being fastened, in a sealed manner, on the outer end of the collar 14. The shut-off device 16 may be arranged in order, by the axial compression of an elastomeric ring, to ensure radial clamping of the end of the tube blank Te, the said clamping being capable of sealing this end and of holding it by clamping. Means (not shown) are provided for the sliding displacement of the collar 14 relative to the collar 3 and for immobilizing the said collar 14 in the desired position.

The other end of the tube blank Te is closed in a sealed manner and locked in a shut-off and clamping device 17 (FIG. 2) similar to the device 16 and forming a piston integral with the end of a cylindrical metal tube 18 extending on the side opposite the collar 3.

The two shut-off devices 16, 17 have passing axially through them respective ducts 16a, 17a for introducing and/or circulating fluid, usually water, within the tube Te.

The tube 18, coaxial relative to the forming barrel 2, can slide in a guide 19 at its end distant from the barrel 2 and is clamped by a drive device B capable of displacing the tube 18 in the axial direction. A conduit C1, in particular a flexible conduit, extends within the tube 18 and is connected to the duct 17a for introducing the fluid into the tube Te.

Another conduit C2, for example also formed by a flexible pipe, extends in the tube 18 and is connected to a duct 20 (FIGS. 2 and 10) provided in the shut-off device 17 forming a piston; this duct 20 comprises a radially oriented part opening out on the outer cylindrical peripheral surface of the piston 17.

A casing 21 (or sleeve), having two coaxial cylindrical walls of different diameter which between them define an annular chamber, is mounted slidably in the forming barrel 2. The inside diameter Di of the casing 21 is equal to the outside diameter of the shut-off piston 17 which can slide with slight friction. The outside diameter of the casing 21 is slightly smaller than the inside diameter of the barrel 2.

The casing 21 defines an inner chamber closed axially at its two longitudinal ends and equipped with two nozzles 22, 23, shown diagrammatically in FIG. 2, for circulating hot fluid, in particular for circulating oil at a temperature near the molecular orientation temperature of the plastic material of the tube Te. If the plastic tube is made of PVC, the molecular orientation temperature of which is within a range of approximately 90° C. to 110° C., hot oil at a temperature of the order of 100° C. is advantageously circulated in the casing 21.

At its outer end, the casing 21 is fastened to a holding and driving device 24 comprising an electric geared motor 25 capable of driving a pinion 26 cooperating with a rack 27 mounted fixedly relative to the forming barrel 2 in parallel with the axis of this barrel.

The inside diameter Di of the casing 21 is determined so as to correspond to the outside diameter of the tube blank Te when the latter has undergone expansion which brings about a circumferential elongation of the plastic at most equal to the yield point of the plastic.

As already explained with regard to FIG. 1, this diameter corresponds to an increase of approximately 30% in the initial outside diameter H of the cylindrical tube blank Te.

Figure 4:
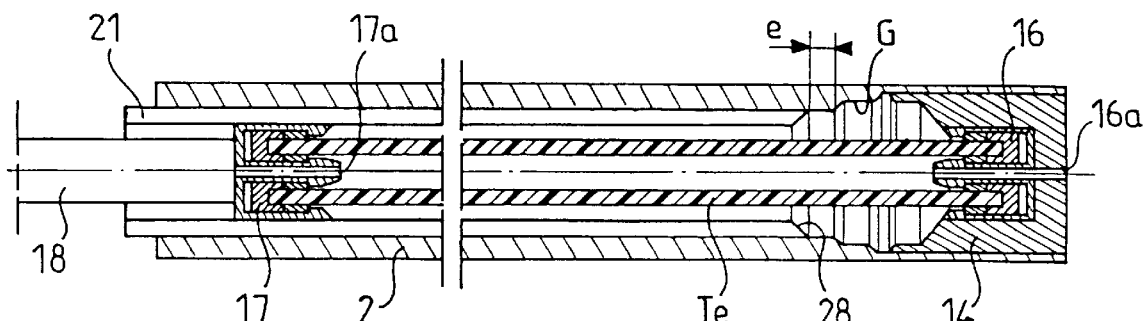
FIG. 4 is a simplified diagram illustrating, in section, the tube blank put in place within the forming barrel.

The length of the casing 21 is selected in such a way that, when this casing 21 has entered the forming barrel 2 virtually completely, as illustrated in FIG. 4, the casing 21 covers almost the entire length of the tube blank Te, with the exception of the end zone located in the region of the cavity G for moulding the socket E and of a cylindrical zone of reduced length e which extends from this cavity G on the side opposite the shut-off device 16.

Preferably, the front end 28 of the casing 21, the said front end facing the socket zone, has a widened frustoconical shape capable of ensuring a progressive transition between the inside diameter of the casing 21 and the inside diameter of the barrel 2.

A device S for detecting the arrival of the plastic against the chamfer 11 during expansion is advantageously provided in the collar 3 (FIG. 3). This device S preferably comprises an optical fibre connected to a light-transmitting and -receiving instrument (not shown) allowing the optical detection of the approach of the plastic. The dwelling provided for the passage of the optical fibre opens via an orifice 0 into the inner passage of the ring 10 in the vicinity of the chamfer 11.

Alternatively, ultrasonic detection may be envisaged.

This being so, the installation putting into practice the manufacturing method according to the invention functions is as follows.

A cylindrical tube blank Te made of plastic is first put in place inside the forming barrel 2. This blank Te has an outside diameter H smaller than the diameter of the desired finished tube and a relatively large thickness, greater than that of the finished tube. As an example, a PVC tube blank Te may have an initial outside diameter of 85 mm with a thickness of 20 mm, whilst the bi-oriented finished tube has a diameter of 160 mm; the intermediate diameter Di, corresponding to uniform radial expansion, is approximately 125 mm in this example.

Preferably, the tube blank Te, for example coming from an installation for the processing of plastic tubes, arrives at a temperature near its molecular orientation temperature.

To put the tube blank Te in place, the collar 14 (FIG. 3) is removed from the collar 3 and the cylindrical tube 18 is pushed to the right, in such a way that the shut-off and clamping device 17 is accessible beyond the collar 3 in order to make it possible to grasp the left-hand end of the blank Te.

When the fastening of the end of the blank Te in the device 17 is carried out, the tube 18 and its shut-off piston 17 are displaced to the left of FIG. 2 and drive the blank Te into the barrel 2 and the casing 21, the position of which is that illustrated in FIG. 4.

The hot blank Te is put in place in this way, avoiding any contact of the blank Te with cold parts, for example at ambient temperature.

When the right-hand end (according to the drawings) of the blank Te arrives in the vicinity of the collar 3, the shut-off device 16 is fastened to the end of the blank and is subsequently locked in the collar 14 which is finally put in place in the collar 3; longitudinal play exists in the space 12 between the ring 10 and the crown 13, allowing the collar 14 subsequently to slide.

At the end of the introduction of the tube blank Te, the configuration is that illustrated in FIG. 4. It can be seen that the casing 21 leaves the inner zone G exposed.

A hot fluid, at a temperature near the molecular orientation temperature of the plastic of the blank Te, is introduced into the blank via the conduit C1 and the duct 17*a*. Where PVC is concerned, the fluid introduced into the blank Te is formed by hot water at a temperature near 100° C. After the duct 16*a* has been closed by means of a valve (not shown), the water pressure in the blank Te is increased in order to bring about the first phase of uniform radial expansion of the tube which is laid against the inner surface of the casing 21, itself being hot on account of the circulation of oil on the inside.

Figure 5:
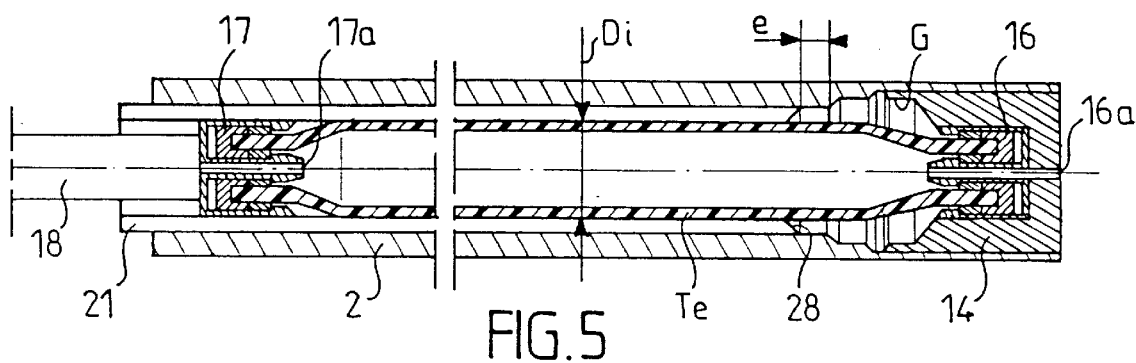
FIG. 5 shows, in a similar way to FIG. 4, the inflated tube at the end of the first phase of radial expansion.

As already explained, this first phase of radial expansion of the tube corresponds to expansion together with a circumferential elongation of the material which does not exceed the yield point of the plastic. In the zone corresponding to the cavity of the socket, where the blank Te is not covered by the casing, expansion remains uniform. During this first phase of radial expansion, the shut-off devices 16 and 17 remain in a fixed position in the axial direction. The thickness of the blank decreases, and the material undergoes virtually no longitudinal stretching. The situation is that illustrated in FIG. 5.

Figure 6:
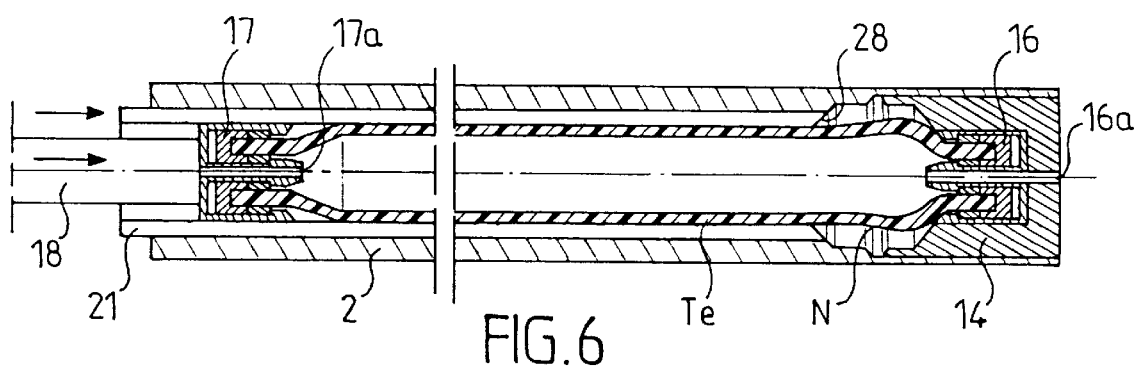
FIG. 6 shows, in a similar way to FIG. 5, a subsequent step of the method which precedes the formation of the socket.

As indicated diagrammatically in FIG. 6, an axial push is then exerted on the left-hand end of the tube blank Te by means of the shut-off piston 17 and the cylindrical tube 18, which is pushed by the device B (FIG. 2), towards the zone of the socket. An axial push is exerted simultaneously on the casing 21 in order likewise to displace it towards the socket zone in such a way as to compensate the distance e. The simultaneous displacement of the tube blank Te and of the casing 21, preferably at the same speed, avoids any unwanted friction liable to damage the outer surface of the blank Te.

The material of the uncovered zone N of the tube blank Te is thus compressed and its thickness increases.

Figure 7:
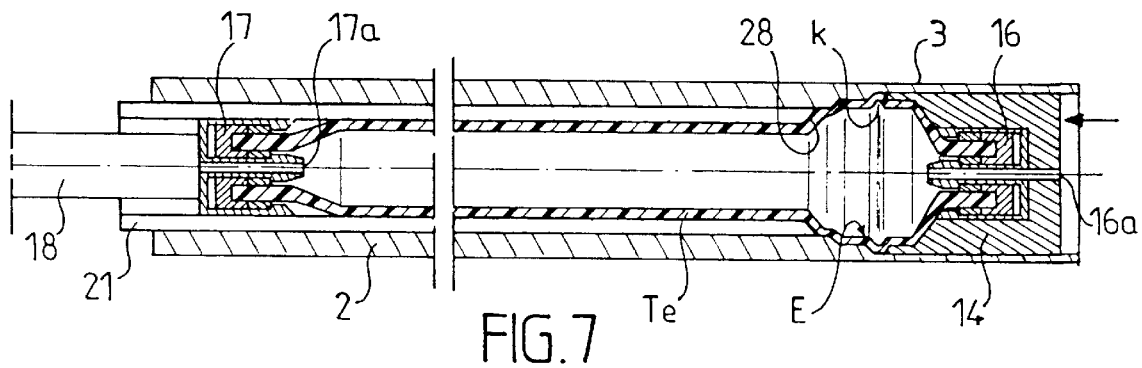
FIG. 7 illustrates the formation of the socket.

The hot-water pressure within the blank Te is subsequently increased in order to produce a blister in the zone N and bring about the formation of the socket E, as illustrated in FIG. 7. During this expansion phase, the circumferential elongation of the material exceeds the yield point of the plastic. The increase in thickness in the zone N, brought about during the step of FIG. 6, makes it possible to obtain, for the walls of the socket E, a virtually constant thickness which is equal to the thickness of the finished tube T in the part other than the socket, this thickness being sufficient to obtain the characteristics of stability under pressure of the socket.

As already explained, a groove k is made in this socket in order to receive a gasket. The wall limiting this groove k is difficult to produce, especially with regards the shape, dimensions and thickness of the wall in the region of this groove.

According to the invention, to obtain a groove k which is as exact as possible, the following procedure is adopted.

Shortly before the wall of the blister comes into contact with the cold surface of the forming tube 2 in the region of its collar 3 during expansion (FIG. 3), an axial push is exerted on the collar 14, towards the piston 17, as illustrated by an arrow in FIG. 7. The crown 13 then engages more deeply into the space 12 of FIG. 3. The result is a thickening of the wall of the blister during formation, mainly in the region of the future groove k which, at the end of production, will have the correct thickness desired.

The exertion of the push on the collar 14 is controlled by the optical-fibre detector S. FIG. 8 illustrates on a larger scale the situation which occurs at the end of the advance of the collar 14.

The wall of the socket E is cooled into shape in contact with the cold wall of the forming barrel 2.

A decrease in the pressure within the blank Te is subsequently ensured in order to release the latter from the inner wall of the casing 21. This casing 21 is then displaced to the left, as illustrated in FIG. 9, in order gradually to expose the surface of the blank Te. The pressure within this blank remains sufficient to ensure the second phase of radial expansion and the propagation of the blister. Shortly after the start of the movement of the casing 21 to the left (according to FIG. 9), the displacement of the cylindrical tube 18, pulling the shut-off device 17 and the blank Te, in the same direction is initiated. Longitudinal stretching of the blank Te is thus brought about, at the same time as it experiences diametral expansion. The casing 21 is driven by starting up the motor 25 (FIG. 2) which drives the pinion 26 cooperating with the rack 27. Any other equivalent device allowing longitudinal displacement, such as a ball guide or a hydraulic system, could be used.

The casing 21 is displaced at a speed higher than that of the shut-off device 17, and the blister arrives in the vicinity of the shut-off device 17 at the end of the forming cycle.

In order to avoid any friction between the blank Te and the casing 21, as illustrated in FIG. 10, compressed air is injected via the duct 20 into the space contained between the blank Te and the inner surface of the casing 21. The air is displaced towards the end 28 of the casing 21, passes round this end and returns, in the opposite direction, between the outer surface of the casing 21 and the inner surface of the forming barrel 2, in order to escape into the atmosphere. This injection of air may be carried out right from the start of the movement of the casing 21 to the left. The air pressure used in this phase is relatively low, in particular of the order of 4 bar.

The longitudinal stretching of the blank Te is therefore controlled perfectly as a result of the controlled displacement of the shut-off device 17, and the outer surface of the blank Te is protected from any damage due to friction.

Since the forming barrel 2 is kept cold, during the propagation of the blister, illustrated in FIG. 9, the wall of the plastic tube therefore comes immediately into contact with a cold wall and sets rapidly, thus making it possible to reduce the duration of the forming cycle substantially. It should be noted that the inner surface of the forming barrel 2 remains at a relatively low temperature, since the circulation of hot oil takes place inside the casing 21; any transmission of heat between the outer wall of the casing 21 and the inner wall of the forming barrel 2 can occur only by contact between solid walls or through radial play and an air layer of small thickness. The transmission of heat is therefore reduced substantially, by comparison with the situation where the hot fluid, intended for maintaining the blank Te at a suitable temperature for the blister-forming operation, circulates directly against the inner wall of the forming barrel 2. In this latter instance, the cooling of the tube T which has just been formed would be longer, thus increasing the duration of the forming cycle and leading to productivity which is markedly below that of the invention.

When the forming cycle is terminated, cold water is introduced into the finished tube T in order to reduce its temperature and set the material, before it is extracted from the forming barrel 2.

Since the increase in diameter of the plastic tube during the blister propagation phase, illustrated in FIG. 9, is relatively small, there is no need to ensure a special geometry at the end 28 of the casing 21. The wall of the blister has sufficient pressure resistance to stand alone, without having to bear against a specific surface.

The shut-off piston 17 makes it possible to follow and/or control the axial expansion of the tube during the development of the blister.

FIG. 11 is a graph illustrating the variations in various parameters during the forming cycle. On this graph, three curves L1, L2, L3 illustrate respectively:

as regards L1, the variations in the pressure within the blank, as regards L2, the variations in the water level in a tank, from which the hot water is extracted in order to be injected into the blank Te and to which it is returned during the introduction of cold water into the blank, and, as regards L3, the displacement of the shut-off piston 17 and of the corresponding end of the blank.

As regards L1, the pressure variations, expressed in bars (or $10^5$ Pa), are plotted on the ordinate as a function of time, expressed in seconds, plotted on the abscissa. The first horizontal segment L1a, with zero relative pressure, corresponds to the filling of the tube blank; it is followed by an ascending segment L1b corresponding to the increase in pressure in the tube. The next horizontal segment L1c corresponds to the circulation of water in the tube blank at constant pressure. The next ascending segment L1d corresponds to the increase in pressure for the formation of the blister; the pressure is maintained on the horizontal segment L1e and is then reduced in order to remain at the level of the stage L1f during the propagation of the blister over the entire length of the tube (the step of FIG. 9). At the end of forming, the pressure may be increased once again according to the peak L1g in order to ensure the laying of the socket E against the mould. The pressure subsequently falls again to the level of the horizontal stage L1h, substantially at the same pressure value as the stage L1c, for the circulation of cooling water and the discharge of the hot water. The pressure returns to the zero relative value via the descending segment L1i.

As regards L2, the water level in the tank is plotted on the ordinate and the time, expressed in seconds, is plotted on the abscissa. The uniform radial expansion of the blank, corresponding to the segment L1b, L1c, is accompanied by an increase in the volume of water inside the tube blank and therefore by a drop in the water level in the tank.

This increase in the volume of water inside the tube blank continues during the formation of the blister and the propagation of this blister until the end of forming which is located at the start of the peak L1g.

When the cooling water is introduced, at the start of stage L1h, the hot water is returned to the tank and the water level in this tank rises again according to the segment L2h.

As regards L3, the amount of displacement of the shut-off piston 17 is plotted on the ordinate as a function of time, in seconds, plotted on the abscissa. A first horizontal segment L3a, corresponding to zero displacement, is followed by a descending segment L3b, representing negative displacement, that is to say the displacement of the shut-off piston 17 towards the socket zone G, for the step of FIG. 6. Displacement subsequently increases according to the segment L3c, this corresponding to the propagation of the blister, as far as the stopping of the piston 17 which corresponds to the horizontal segment L3d.

Finally, the bi-oriented tube T is withdrawn from the barrel 2 and, if appropriate, is cooled again by spraying water onto its outer surface, and the shut-off devices 16 and 17 are demounted. The non-expanded ends of the tube T which were held in the shut-off devices 16 and 17 are cut off, while a new blank Te is being introduced into the forming barrel 2.

The characteristics of a tube obtained by means of the method of the invention were analysed, in particular in the region of the socket or tulip E which, as illustrated in FIG. 12, were broken down in a virtual manner into several segments Ea, Eb . . . Ee for the requirements of the analysis.

Ea corresponds to the entry zone of the socket, into which zone penetrates first the end of another tube intended to be assembled together with that equipped with the socket illustrated in FIG. 12.

Eb corresponds to the first oblique wall of the groove k and substantially to half the bottom of the groove.

The zone Ec corresponds to the other half of the bottom of the groove k and to the other oblique wall.

Ed corresponds to the cylindrical socket bottom zone located between the groove k and the frustoconical transitional zone Ee.

Finally, the zone f (barrel) corresponds to the start of the cylindrical tube and does not form part of the actual socket E.

To analyse the variations in axial length between the various zones of the blank which correspond to those of the finished socket E, the following procedure was adopted.

A sample of tulip or socket E, produced according to the invention and made of PVC, was cut out and then placed in an oven at 150° C. for 1 hour.

Once this operation was terminated, the heating of the oven was switched off and the temperature was allowed to fall to the ambient temperature of the part; this operation was carried out within approximately 15 hours.

After such processing, the socket E recovers its original cylindrical blank shape (the temperature having exceeded the vitreous transition of the polymer). The limits between the various zones Ea, Eb . . . Ee, f had been previously marked at n1, n2 . . . n6.

Before the thermal processing causing a return to the blank, the laid-out lengths of the various zones Ea . . . Ee, f were measured on the finished socket; these lengths correspond to the laid-out distances between the marks n0 . . . n6.

The lengths of the same zones were measured on the socket region which had returned to the shape of the blank after thermal processing.

The relative axial stretching Δl/l is defined as being equal to:

(laid-out length of a zone on the finished tube–laid-out length on the restored blank)/laid-out length on the restored blank.

The following results were obtained (lengths in mm):

|  | Ea | Eb | Ec | Ed | Ee | Total socket alone | Barrel |
|---|---|---|---|---|---|---|---|
| Length on blank | 28 | 19 | 20 | 67 | 24 | 158 | 50 |
| Length on finished tube | 35 | 24 | 20 | 74 | 28 | 181 | 54.5 |
| Axial stretching Δl/l in % | 21% | 26% | 0% | 10% | 17% | 15% | |

It thus emerges that the axial stretching of the socket alone over its entire extent, that is to say over the zones Ea–Ee, is of the order of 15%, whilst, on the tube (corresponding to the zone f), this axial stretching is only approximately 9%. In other words, axial stretching in the region of the socket as a whole is greater than that of the remaining part of the tube and is even greater than 1.5 times the axial stretching of the remaining part of the tube.

This axial stretching contributes to reinforced bi-orientation in the region of the socket and to good mechanical characteristics of this socket.

Furthermore, with the method of the invention, although axial stretching is higher in the region of the socket, the thickness of the wall of this socket is substantially the same as that of the remaining part of the tube.

What is claimed is:

1. A method for manufacturing plastic tubes, according to which a tube blank brought to a temperature near its molecular orientation temperature is subjected to a biaxial stretching as a result of the radial expansion of the tube blank within a forming barrel, the inner diameter of the forming barrel being slightly larger than the diameter of the plastic tube, with the exception of thermal expansion, with formation of a blister at one end of the tube and controlled displacement of the blister as far as the other end of the tube, and with longitudinal stretching, wherein the radial expansion comprises at least two phases, during a first phase, the tube blank being inflated to an intermediate diameter determined by a double-wall casing introduced into the forming barrel, the casing having a hot fluid circulating between the two walls of the casing; and, during a second phase, the casing being progressively taken out of the forming barrel to allow radial expansion of the plastic tube to the inner diameter of the forming barrel and longitudinal stretching of the tube; and wherein the forming barrel is cooled externally.

2. The method according to claim 1, wherein the longitudinal stretching of the tube, carried out essentially during the second phase, is obtained by locking the two ends of the tube blank in first and second clamping means and by moving the first and second clamping means away from each other.

3. The method according to claim 1, wherein a pressurized gas medium is injected between the outer wall of the plastic tube and the inner wall of the casing to facilitate the tube and the casing in sliding relative to each other when the tube is taken out of the casing and to avoid unwanted friction.

4. The method according to claim 1, wherein a free space remains within the forming barrel between the end of the sliding casing which is engaged in the barrel and the adjacent end of the barrel, the free space making it possible to produce the blister as a result of an increase in the internal pressure in the tube blank without the need to displace the sliding casing beforehand.

5. The method according to claim 1, wherein a socket with a groove for receiving a gasket is formed on the plastic tube during the formation of the blister at one end of the tube.

6. The method according to claim 5, wherein the forming barrel is cooled externally by spraying or regulation.

7. A method for manufacturing plastic tubes, according to which a tube blank brought to a temperature near its molecular orientation temperature is subjected to biaxial stretching as a result of the radial expansion of the tube blank within a forming barrel, the inner diameter of the forming barrel being slightly larger than the diameter of the plastic tube, with the exception of thermal expansion, with formation of a blister at one end of the tube and controlled displacement of the blister as far as the other end of the tube, and with longitudinal stretching,
    wherein the radial expansion comprises a first phase and a second phase;
    wherein, during the first phase, the tube blank is inflated uniformly to an intermediate diameter, at which the circumferential elongation remains below or equal to the yield point of the material of the tube, the first phase taking place virtually without any longitudinal stretching; and
    wherein the second phase changes to the inside diameter of the forming barrel, with longitudinal stretching.

8. The method according to claim 7,
    wherein the intermediate diameter is determined by introducing a sliding casing into the forming barrel, the sliding casing having a double wall structure for internal circulation of a hot fluid, the inside diameter of the sliding casing being slightly larger than the intermediate diameter; and
    wherein, after the first expansion phase, the sliding casing is progressively taken out of the forming barrel in order to allow the second phase of radial expansion.

9. A method for manufacturing plastic tubes, according to which a tube blank brought to a temperature near its molecular orientation temperature is subjected to a biaxial stretching as a result of the radial expansion of the tube blank within a forming barrel, the inner diameter of the forming barrel being slightly larger than the diameter of the plastic tube, with the exception of thermal expansion, with formation of a blister at one end of the tube and controlled displacement of the blister as far as the other end of the tube, and with longitudinal stretching,
    wherein the radial expansion comprises at least two phases, during a first phase, the tube blank being inflated to an intermediate diameter determined by a double-wall casing introduced into the forming barrel, the casing having a hot fluid circulating between the two walls of the casing; and, during a second phase, the casing being progressively taken out of the forming barrel to allow radial expansion of the plastic tube to the inner diameter of the forming barrel and longitudinal stretching of the tube;
    wherein the forming barrel is cooled externally; and
    wherein the end of the plastic tube which is distant from the blister formation zone is pushed towards this zone when the blister is formed to bring about an increase in the thickness of the material making it possible to obtain a blister having a thickness which is substantially equal to that of the remaining part of the tube.

10. A method for manufacturing plastic tubes, according to which a tube blank brought to a temperature near its molecular orientation temperature is subjected to a biaxial stretching as a result of the radial expansion of the tube blank within a forming barrel, the inner diameter of the forming barrel being slightly larger than the diameter of the plastic tube, with the exception of thermal expansion, with formation of a blister at one end of the tube and controlled displacement of the blister as far as the other end of the tube, and with longitudinal stretching,
    wherein the radial expansion comprises at least two phases, during a first phase, the tube blank being inflated to an intermediate diameter determined by a double-wall casing introduced into the forming barrel, the casing having a hot fluid circulating between the two walls of the casing; and, during a second phase, the casing being progressively taken out of the forming barrel to allow radial expansion of the plastic tube to the inner diameter of the forming barrel and longitudinal stretching of the tube,
    wherein the forming barrel is cooled externally;.
    wherein a socket with a groove for receiving a gasket is formed on the plastic tube during the formation of the blister at one end of the tube; and
    wherein, when the wall of the blister comes into contact with the wall of a socket mold, the adjacent end of the tube is pushed towards the socket to obtain a wall thickness in the region of the groove, the wall thickness being substantially equal to the thickness of the rest of the socket and of the tube.

11. A method for manufacturing plastic tubes, comprising:
    biaxially stretching a tube blank at a temperature near its molecular orientation temperature as a result of a radial expansion of the tube blank within a forming barrel, the inner diameter of the forming barrel being slightly larger than the diameter of the plastic tube, with the exception of a thermal expansion,
    forming a blister at one end of the tube and controlled displacement of the blister as far as the other end of the tube, and with longitudinal stretching,
    wherein the radial expansion comprises first and second phases;
    wherein, during the first phase, the tube blank is inflated uniformly to an intermediate diameter, at which the circumferential elongation remains below or equal to the yield point of the material of the tube, the first phase taking place virtually without any longitudinal stretching; and
    wherein, during the second phase, the tube blank is radially expanded to the inner diameter of the forming barrel and is longitudinally stretched.

12. The method according to claim 11, wherein the formation of the blister occurs during the second phase.

13. An installation for manufacturing a plastic tube, comprising:
    a forming barrel, in which a tube blank is engaged;
    a double-wall casing slidably mounted in the forming barrel and having an inner diameter for determining an intermediate expansion diameter of the plastic tube, the casing surrounding a first end of the tube blank;
    a cylinder member extending beyond one end of the double-wall casing;
    means for driving the double-wall casing and the cylinder member in a sliding manner;
    means for clamping first and second ends of the tube blank respectively, wherein:
        the clamping means at the first end of the tube blank forms a piston slidably mounted in the double-wall casing and integrated with the cylinder member; and the clamping means at the second end of the tube blank forms means for shutting off the forming barrel and defines a mold portion for forming a socket on the plastic tube, the mold portion comprising at least first and second parts which are slidably mounted relative to each other and define a groove portion for a gasket, the first part being located axially towards an outside of the plastic tube and approaching the second part to bring a material into the region of the groove portion for the gasket;

means for detecting the coming of a wall of the socket against the second part of the mold portion to trigger the displacement of the first part of the mold portion when contact is made;

means for introducing a fluid into the tube blank and for varying the pressure of the fluid; and means for circulating a hot fluid in the double-wall casing.

14. The installation according to claim 13, wherein the piston comprises a passage means communicating with a space between the outer wall of the plastic tube and the inner wall of the casing.

* * * * *